United States Patent
van Rensburg et al.

(10) Patent No.: US 8,116,267 B2
(45) Date of Patent: Feb. 14, 2012

(54) METHOD AND SYSTEM FOR SCHEDULING USERS BASED ON USER-DETERMINED RANKS IN A MIMO SYSTEM

(75) Inventors: Cornelius van Rensburg, Dallas, TX (US); Yinong Ding, Plano, TX (US); Farooq Khan, Allen, TX (US); Jiann-An Tsai, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 440 days.

(21) Appl. No.: 11/620,401

(22) Filed: Jan. 5, 2007

(65) Prior Publication Data

US 2007/0183380 A1  Aug. 9, 2007

Related U.S. Application Data

(60) Provisional application No. 60/771,669, filed on Feb. 9, 2006.

(51) Int. Cl.
*H04W 4/00* (2009.01)

(52) U.S. Cl. ........ 370/329; 370/335; 370/338; 370/437; 370/441; 370/479

(58) Field of Classification Search .................. 370/338, 370/328, 329, 330, 335, 339, 341, 342, 349, 370/347, 431, 441, 442, 455; 455/450, 452.1, 455/452.2, 475.7
See application file for complete search history.

(56) References Cited

U.S. PATENT DOCUMENTS

| | | | |
|---|---|---|---|
| 6,671,849 B2 * | 12/2003 | Tripathi et al. | 714/746 |
| 6,873,606 B2 * | 3/2005 | Agrawal et al. | 370/310 |
| 7,013,143 B2 * | 3/2006 | Love et al. | 455/450 |
| 7,079,550 B2 * | 7/2006 | Padovani et al. | 370/468 |
| 7,254,769 B2 * | 8/2007 | Kim et al. | 714/774 |
| 7,428,269 B2 * | 9/2008 | Sampath et al. | 375/267 |
| 7,706,347 B2 * | 4/2010 | Kim et al. | 370/342 |
| 7,873,021 B2 * | 1/2011 | Petre et al. | 370/342 |
| 2003/0043732 A1 * | 3/2003 | Walton et al. | 370/208 |
| 2003/0043764 A1 | 3/2003 | Kim et al. | |
| 2003/0112744 A1 * | 6/2003 | Baum et al. | 370/206 |
| 2003/0125040 A1 * | 7/2003 | Walton et al. | 455/454 |
| 2004/0057530 A1 | 3/2004 | Tarokh et al. | |
| 2004/0121730 A1 * | 6/2004 | Kadous et al. | 455/13.3 |
| 2004/0136349 A1 * | 7/2004 | Walton et al. | 370/338 |

(Continued)

FOREIGN PATENT DOCUMENTS

KR  1020030017349 A  3/2003

(Continued)

OTHER PUBLICATIONS

Tetsushi et al. A hybrid MIMO System Using Spatial Correlation, IEEE 2002.*

(Continued)

*Primary Examiner* — Kent Chang

*Assistant Examiner* — Magdi Elhag (57) ABSTRACT

In a wireless network comprising a plurality of subscriber stations and a base station capable of providing service to the subscriber stations, a subscriber station is provided that includes a rank selector and a scheduling data reporter. The rank selector is operable to select a rank for the subscriber station. The rank is operable to identify a number of antennas for transmitting data streams from the base station to the subscriber station. The scheduling data reporter is operable to report scheduling data, including the rank, to the base station.

20 Claims, 7 Drawing Sheets

U.S. PATENT DOCUMENTS

| | | | |
|---|---|---|---|
| 2004/0218697 A1* | 11/2004 | Liu | 375/340 |
| 2005/0043031 A1* | 2/2005 | Cho et al. | 455/450 |
| 2005/0201295 A1 | 9/2005 | Kim et al. | |
| 2005/0237971 A1* | 10/2005 | Skraparlis | 370/329 |
| 2006/0018259 A1* | 1/2006 | Kadous | 370/236 |
| 2006/0018397 A1* | 1/2006 | Sampath et al. | 375/267 |
| 2006/0115014 A1* | 6/2006 | Jeong et al. | 375/267 |
| 2006/0153216 A1* | 7/2006 | Hosein et al. | 370/412 |
| 2006/0276212 A1* | 12/2006 | Sampath et al. | 455/513 |
| 2006/0285585 A1* | 12/2006 | Sampath | 375/227 |
| 2007/0005749 A1* | 1/2007 | Sampath | 709/223 |
| 2007/0147536 A1* | 6/2007 | Melzer et al. | 375/267 |
| 2008/0019434 A1* | 1/2008 | Kim et al. | 375/232 |

FOREIGN PATENT DOCUMENTS

| | | |
|---|---|---|
| WO | WO 03/101029 A1 | 12/2003 |
| WO | WO 2004038984 A2 * | 5/2004 |
| WO | WO 2005/034387 | 4/2005 |

OTHER PUBLICATIONS

Ye Li, et al. (Signal detection for MIMO-OFDM wireless communications, IEEE International Conference on Communications, vol. 10, Jun. 11-14, 2001 pp. 3077-3081.*

Alessio Milani et al., "On the use of per-antenna rate and power adaptation in V-BLAST systems for protocol performance improvement," 2002 IEEE 56th Vehicular Technology Conference Proceedings, Vancouver, Canada, Sep. 24-28, 2002, IEEE Vehicular Technology Conference, New York, NY, vol. 1 of 4, Conf. 56, Sep. 24, 2002, pp. 2126-2130.

Sungjin Kim et al., "An Overview of MIMO Technologies for Enhanced 3GPP HSDPA," JTR Japan Telecommunications Review, vol. 14, No. 3, Jun. 2004, 19 pages.

Jihoon Choi et al., "Interpolation Based Unitary Precoding for Spatial Multiplexing MIMO-OFDM with Limited Feedback," IEEE Communications Society, 2004, pp. 214-218.

David J. Love et al., "What Is the Value of Limited Feedback for MIMO Channels?," Adaptive Antennas and MIMO Systems for Wireless Communications, IEEE Communications Magazine, Oct. 2004, pp. 54-59.

Quentin H. Spencer et al., "Zero-Forcing Methods for Downlink Spatial Multiplexing in Multiuser MIMO Channels," IEEE Transactions on Signal Processing, vol. 52, No. 2, Feb. 2004, pp. 461-471.

Giovanni Del Galdo et al., "Comparison of Zero-Forcing Methods for Downlink Spatial Multiplexing in Realistic Multi-User MIMO Channels," 2004 IEEE, pp. 299-303.

Wessam Ajib et al., "An Overview of Scheduling Algorithms in MIMO-Based Fourth-Generation Wireless Systems," 2005 IEEE, pp. 43-48.

Shu Lin et al., "Error Control Coding, Fundamentals and Applications," 1983, 25 pages.

Jianzhong Zhang et al., "Closed-Loop MIMO Precoding with Limited Feedback," IEEE 802.16 Broadband Wireless Access Working Group, Nov. 4, 2004, 13 pages.

Zhihong Hong et al., "Spatial Multiplexing in Correlated Fading via the Virtual Channel Representation," IEEE Journal on Selected Areas in Communications, vol. 21, No. 5, Jun. 2003, pp. 856-866.

International Search Report dated May 21, 2007 in connection with International Patent Application No. PCT/KR2007/000660.

Anh Van Nguyen, et al., "Hybrid ARQ Protocols Using Space-time Codes", IEEE Vehicular Technology Conference, Oct. 7-11, 2001, p. 3264-2368.

* cited by examiner

METHOD AND SYSTEM FOR SCHEDULING USERS BASED ON USER-DETERMINED RANKS IN A MIMO SYSTEM

CROSS-REFERENCE TO RELATED APPLICATIONS AND CLAIM OF PRIORITY

The present application is related to U.S. Provisional Patent No. 60/771,669, filed Feb. 9, 2006, titled "Downlink MIMO for EUTRA." U.S. Provisional Patent No. 60/771,669 is assigned to the assignee of the present application and is hereby incorporated by reference into the present disclosure as if fully set forth herein. The present application hereby claims priority under 35 U.S.C. §119(e) to U.S. Provisional Patent No. 60/771,669.

TECHNICAL FIELD OF THE INVENTION

The present application relates generally to wireless communication networks and, more specifically, to a method and system for scheduling users based on user-determined ranks in a Multiple Input/Multiple Output (MIMO) system.

BACKGROUND OF THE INVENTION

Orthogonal frequency division multiplexing (OFDM) is a multi-carrier transmission technique in which a user transmits on many orthogonal frequencies (or subcarriers). The orthogonal subcarriers are individually modulated and separated in frequency such that they do not interfere with one another. This provides high spectral efficiency and resistance to multipath effects. An orthogonal frequency division multiple access (OFDMA) system allows some subcarriers to be assigned to different users, rather than to a single user. Today, OFDM and OFDMA technology are used in both wireline transmission systems, such as asymmetric digital subscriber line (ADSL), and wireless transmission systems, such as IEEE-802.11a/g (i.e., WiFi), IEEE-802.16 (e.g., WiMAX), digital audio broadcast (DAB), and digital video broadcast (DVB). This technology is also used for wireless digital audio and video broadcasting.

In conventional OFDM networks, a fixed data rate may be used and the amount of transmission power may be adjusted based on how far away the user is from the transmission node. Alternatively, data may always be transmitted at full power, but if the user is close to the transmission node, a higher order modulation and a weaker code are used. On the other hand, if the user is far away from the transmission node, a lower order modulation and a stronger code are used. For some OFDM networks, two antennas may be used to transmit two data streams to one user, resulting in a doubled data rate. However, at a cell edge, the two data streams may interfere with each other to such an extent that the modulation and coding have to be backed off too far for successful communication. Therefore, there is a need in the art for an improved method of communicating with users in a MIMO system.

SUMMARY OF THE INVENTION

In a wireless network comprising a plurality of subscriber stations and a base station capable of providing service to the subscriber stations, a subscriber station is provided. According to an advantageous embodiment of the present disclosure, the subscriber station includes a rank selector and a scheduling data reporter. The rank selector is operable to select a rank for the subscriber station. The rank is operable to identify a number of antennas for transmitting data streams from the base station to the subscriber station. The scheduling data reporter is operable to report scheduling data, including the rank, to the base station.

According to another embodiment of the present disclosure, a method for scheduling users in a base station based on user-determined ranks in a MIMO system is provided that includes receiving scheduling data from each of a plurality of users. The scheduling data for each user comprises at least one channel quality indicator (CQI), a rank and a preferred pre-coding matrix and vector. The users are scheduled based on the scheduling data.

According to yet another embodiment of the present disclosure, a method for communicating between a transmitter and a receiver in a MIMO system is provided that includes receiving a frame from the transmitter at the receiver. The frame includes a plurality of codewords. Each codeword has a different hybrid automatic repeat request (HARQ) channel. The frame is processed using HARQ messaging.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or" is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

Figure 1:
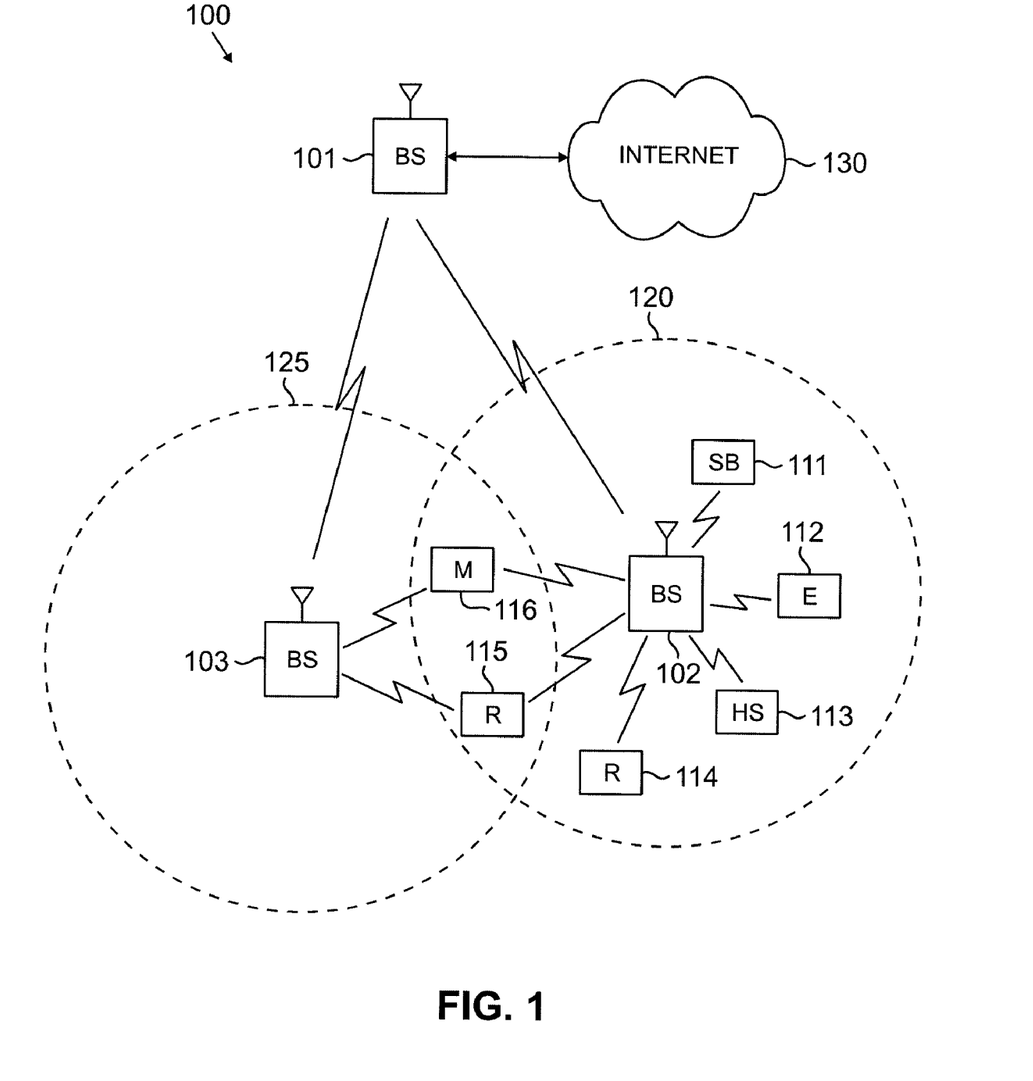
FIG. 1 illustrates a wireless network capable of scheduling users based on user-determined ranks in a Multiple Input/Multiple Output (MIMO) system according to one embodiment of the disclosure.

FIG. 1 illustrates a wireless network 100 capable of scheduling users based on user-determined ranks in a Multiple Input/Multiple Output (MIMO) system according to one embodiment of the disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. In an exemplary embodiment, SS 111 may be located in a small business (SB), SS 112 may be located in an enterprise (E), SS 113 may be located in a WiFi hotspot (HS), SS 114 may be located in a first residence, SS 115 may be located in a second residence, and SS 116 may be a mobile (M) device.

Base station 103 provides wireless broadband access to network 130, via base station 101, to a second plurality of subscriber stations within coverage area 125 of base station 103. The second plurality of subscriber stations includes subscriber station 115 and subscriber station 116. In alternate embodiments, base stations 102 and 103 may be connected directly to the Internet by means of a wired broadband connection, such as an optical fiber, DSL, cable or T1/E1 line, rather than indirectly through base station 101.

In other embodiments, base station 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be operating in handoff mode, as known to those of skill in the art.

In an exemplary embodiment, base stations 101-103 may communicate with each other and with subscriber stations 111-116 using an IEEE-802.16 wireless metropolitan area network standard, such as, for example, an IEEE-802.16e standard. In another embodiment, however, a different wireless protocol may be employed, such as, for example, a HIPERMAN wireless metropolitan area network standard. Base station 101 may communicate through direct line-of-sight or non-line-of-sight with base station 102 and base station 103, depending on the technology used for the wireless backhaul. Base station 102 and base station 103 may each communicate through non-line-of-sight with subscriber stations 111-116 using OFDM and/or OFDMA techniques.

Base station 102 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, cafe, hotel, or college campus. Base station 102 may provide digital subscriber line (DSL) level service to subscriber stations 114, 115 and 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from less than 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. In the case of voice-based communications in the form of voice-over-IP (VoIP), the traffic may be forwarded directly to the Internet gateway instead of the PSTN gateway. The servers, Internet gateway, and public switched telephone network gateway are not shown in FIG. 1. In another embodiment, the connection to network 130 may be provided by different network nodes and equipment.

As described in more detail below, one or more of subscriber stations 111-116 may be operable to determine a rank for itself and to report the rank to a base station 101-103. In addition, one or more of base stations 101-103 may be operable to schedule the subscriber stations 111-116 in its coverage area based on the ranks reported by the subscriber stations 111-116. Each rank is operable to identify a number of layers that is equal to the number of virtual antennas for transmitting data streams from a base station 101-103 to the subscriber station 111-116 that reported the rank. As described in more detail below, the antennas may comprise virtual antennas. The base stations 101-103 and the subscriber stations 111-116 may also be able to communicate with each other using hybrid automatic repeat request (HARQ) messaging.

MIMO systems enable additional degrees of freedom that may be used in various ways for improving system performance including, but not limited to, diversity gain against fading, beamforming gain, spatial multiplexing of multiple data codewords to the same user (SDM), and spatial multiplexing of multiple data codewords to different users (SDMA). In a wireless environment such as wireless network 100, different subscriber stations 111-116 (or users) experience different channel types due to differing power delay profiles, mobile speed and the like. Moreover, different users experience different Signal-to-Interference-plus-Noise Ratio (SINR) due to user location, shadow fading and the like. Using the principles of the present disclosure, the additional degrees of freedom enabled by multiple antennas may be exploited on a user-by-user basis that results in improved system performance and capacity while the overhead and system complexity are kept at reasonable levels. This may be accomplished by implementing a multi-user MIMO scheduling and pre-coding approach that exploits the additional degrees of freedom enabled by the pre-coded multiple transmit antennas to schedule multiple users simultaneously on the same OFDM resource-block (SDMA) or the transmission of multiple data codewords to the same user (SDM).

When there are many users in a cell 120, 125, significant gains may be realized in system throughput by using a multi-user MIMO (MU-MIMO) scheme as compared to a single-user MIMO (SU-MIMO) scheme. This is because MU-MIMO exploits multi-user diversity gain (MUDG) on a per-codeword level. However, SU-MIMO can increase the peak user data rate. This is especially important due to the bursty nature of actual traffic flows (as opposed to the full buffer modeling). There are many times during which there are very few users in a cell 120, 125 with active buffers. Therefore, a MIMO scheme that supports both multi-user and single-user schemes without increasing the signaling overhead is useful. Another advantage of a SU-MIMO scheme is that the use of successive interference cancellation (SIC) techniques, which are enhanced by separately CRC encoding each codeword, may be easily exploited. As described in more detail below, base stations 101-103 may be operable to determine when to switch between MU-MIMO and SU-MIMO based on any suitable criteria.

Figure 2A:
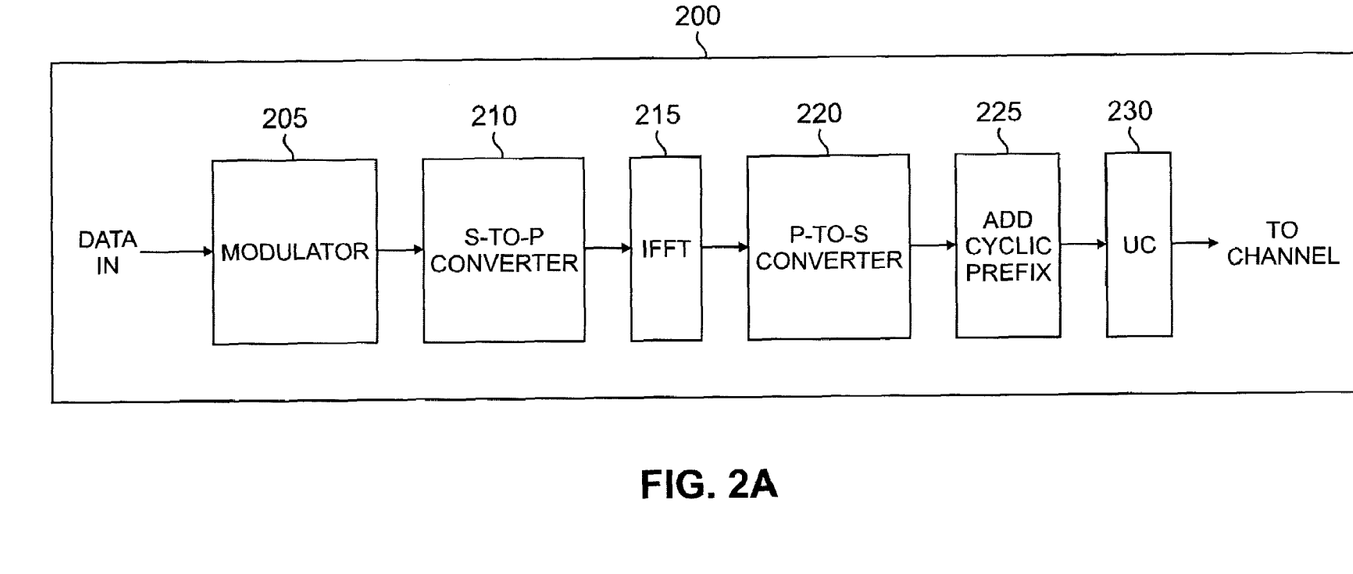
FIGS. 2A-B are block diagrams of an orthogonal frequency division multiple access (OFDMA) transmitter and an OFDMA receiver, respectively, according to an embodiment of the disclosure.
Figure 2B:
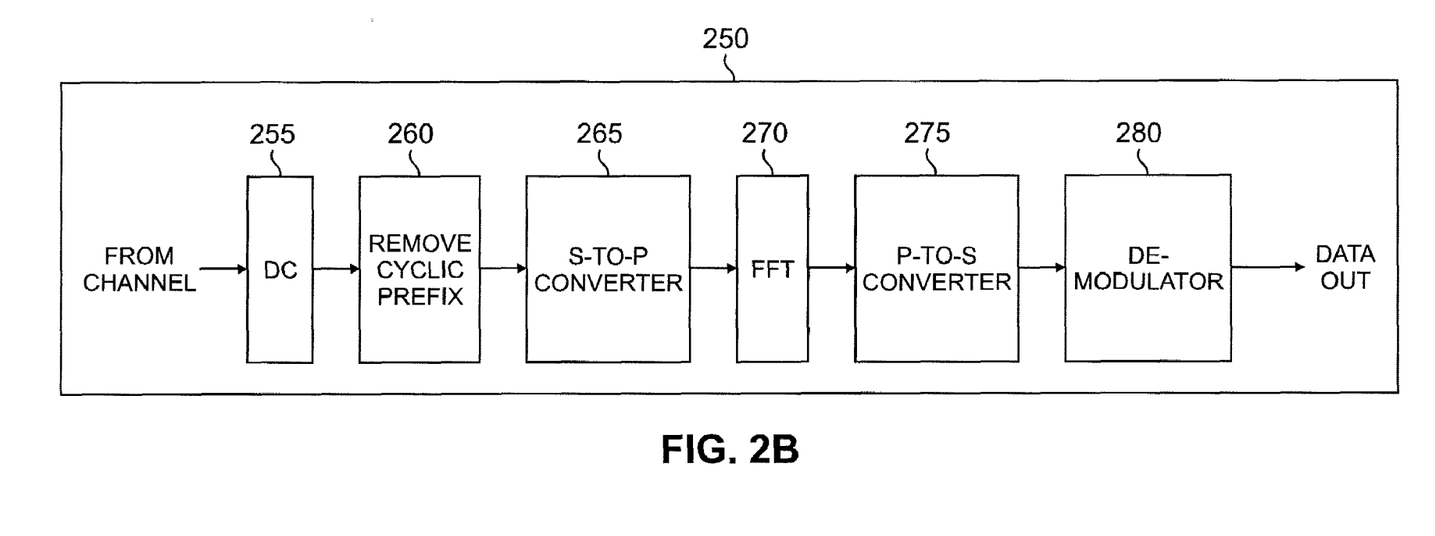

FIG. 2A is a block diagram of orthogonal frequency division multiple access (OFDMA) transmitter 200. FIG. 2B is a block diagram of OFDMA receiver 250. OFDMA transmitter 200 or OFDMA receiver 250, or both, may be implemented in any of base stations 101-103 of wireless network 100. Similarly, OFDMA transmitter 200 or OFDMA receiver 250, or both, may be implemented in any of subscriber stations 111-116 of wireless network 100.

OFDMA transmitter 200 comprises a modulator 205, a serial-to-parallel (S-to-P) converter 210, an Inverse Fast Fourier Transform (IFFT) block 215, a parallel-to-serial (P-to-S) converter 220, an add cyclic prefix block 225, and an up-converter (UC) 230. OFDMA receiver 250 comprises a down-converter (DC) 255, a remove cyclic prefix block 260, a serial-to-parallel (S-to-P) converter 265, a Fast Fourier Transform (FFT) block 270, a parallel-to-serial (P-to-S) converter 275, and a demodulator 280. For one embodiment, modulator 205 comprises a quadrature amplitude modulation (QAM) modulator and demodulator 280 comprises a QAM demodulator. It will be understood that transmitter 200 and/or receiver 250 may comprise additional components not illustrated in FIGS. 2A and 2B without departing from the scope of the present disclosure.

At least some of the components in FIGS. 2A and 2B may be implemented in software while other components may be implemented by configurable hardware or a mixture of software and configurable hardware. In particular, it is noted that the IFFT block 215 and the FFT block 270 described in this disclosure may be implemented as configurable software algorithms. These blocks 215 and 270 may each have a corresponding size of N and the value of N may be modified according to the implementation.

Furthermore, although the present disclosure is directed to an embodiment that implements the Fast Fourier Transform and the Inverse Fast Fourier Transform, this is by way of illustration only and should not be construed so as to limit the scope of this disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of N may be any integer number (i.e., 1, 2, 3, 4, etc.), while for FFT and IFFT functions, the value of N may be any integer number that is a power of two (i.e., 1, 2, 4, 8, 16, etc.).

In OFDMA transmitter 200 for one embodiment, modulator 205 receives a set of information bits and modulates the input bits to produce a sequence of frequency-domain modulation symbols. Modulator 205 modulates the input bits using modulation and coding that may be selected based on ranks determined by the receiver 250, as described in more detail below. Serial-to-parallel converter 210 converts (e.g., de-multiplexes) the serial symbols to parallel data, thereby producing N parallel symbol streams (where N is the IFFT/FFT size used in transmitter 200 and receiver 250). IFFT block 215 then performs an IFFT operation on the N parallel symbol streams to produce time-domain output signals. Parallel-to-serial converter 220 converts (e.g., multiplexes) the parallel time-domain output symbols from IFFT block 215 to produce a serial time-domain signal. Add cyclic prefix block 225 then adds a cyclic prefix onto the time-domain signal.

Finally, up-converter 230 up-converts the output of add cyclic prefix block 225 to RF frequency for transmission via the forward channel or reverse channel, depending on whether OFDMA transmitter 200 is implemented in a base station or a subscriber station. The signal from add cyclic prefix block 225 may also be filtered at baseband before conversion to RF frequency. The time-domain signal transmitted by OFDMA transmitter 200 comprises multiple overlapping sinusoidal signals corresponding to the data symbols transmitted.

In OFDMA receiver 250, an incoming RF signal is received from the forward channel or reverse channel, depending on whether OFDMA receiver 250 is implemented in a subscriber station or a base station. OFDMA receiver 250 reverses the operations performed in OFDMA transmitter 200. Down-converter 255 down-converts the received signal to baseband frequency and remove cyclic prefix block 260 removes the cyclic prefix to produce the serial time-domain baseband signal. Serial-to-parallel converter 265 converts the time-domain baseband signal to parallel time-domain signals. FFT block 270 then performs an FFT algorithm to produce N parallel frequency-domain signals. Parallel-to-serial converter 275 converts the parallel frequency-domain signals to a sequence of data symbols. Demodulator 280 then demodulates the symbols to recover the original input data stream.

Figure 3:
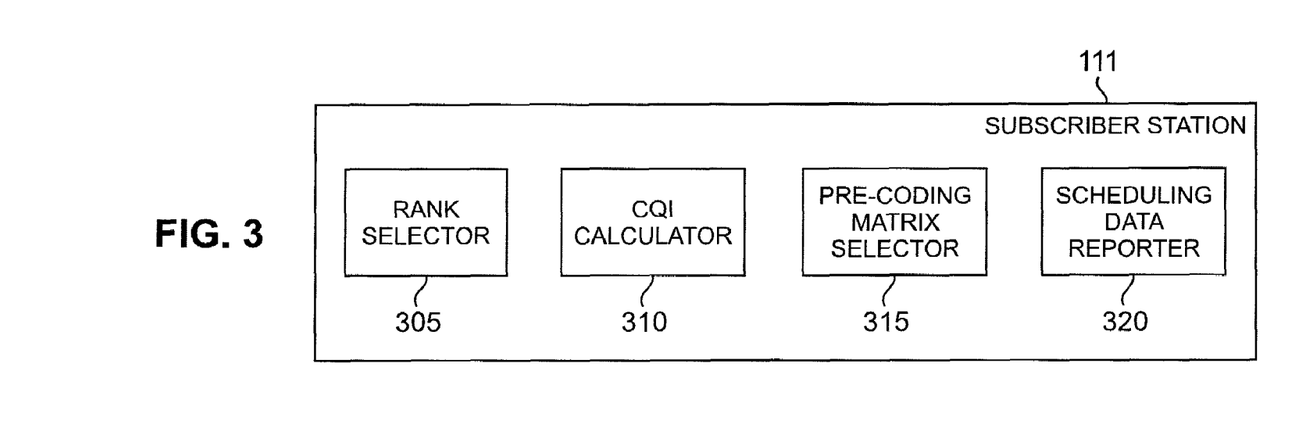
FIG. 3 illustrates one of the subscriber stations of FIG. 1 according to one embodiment of the disclosure.

FIG. 3 illustrates subscriber station 111 according to one embodiment of the disclosure. For this embodiment, subscriber station 111 comprises a rank selector 305, a channel quality indicator (CQI) calculator 310, a pre-coding matrix selector 315 and a scheduling data reporter 320. It will be understood that subscriber station 111 comprises additional components not illustrated in FIG. 3.

As described in more detail below, rank selector 305 is operable to select a rank for the subscriber station 111 for use in scheduling the subscriber station 111 by a base station, such as base station 102. Rank selector 305 is operable to select the rank in such a manner as to maximize the capacity of subscriber station 111. For one particular embodiment, the rank may comprise either low or high. For other embodiments, the rank may comprise one of three or more ranks.

CQI calculator 310 is operable to calculate a CQI for each codeword received from each virtual antenna of transmitter 200 based on the rank calculated by rank selector 305. Pre-coding matrix selector 315 is operable to select a preferred pre-coding matrix for subscriber station 111. As described in more detail below, pre-coding matrix selector 315 may be operable to select one preferred pre-coding matrix from a set of possible pre-coding matrices for the subscriber station 111.

Each pre-coding matrix comprises a plurality of pre-coding vectors. For one embodiment, CQI calculator 310 may be operable to calculate a CQI for each vector in each matrix in the set of matrices. Pre-coding matrix selector 315 is operable to select the pre-coding matrix with the best CQI values calculated by CQI calculator 310.

Scheduling data reporter 320 is operable to report scheduling data to a base station, such as base station 102. The scheduling data may comprise the rank selected by rank selector 305, one or more CQIs calculated by CQI calculator 310, and the preferred pre-coding matrix and vector selected by pre-coding matrix selector 315. For one embodiment, the scheduling data comprises each CQI value calculated by CQI calculator 310. For another embodiment, the scheduling data comprises a single CQI value, such as the best CQI value calculated by CQI calculator 310, along with a vector identifier to identify the vector corresponding to the single CQI value. For yet another embodiment, the scheduling data comprises a CQI value for each vector in the preferred pre-coding matrix.

Rank selector 305 may be used to select a rank for subscriber station 111 because some subscriber stations 111-116 may experience correlated fading while other subscriber stations 111-116 in the same cell 120, 125 experience un-correlated fading. Rank selector 305 may be operable to select the rank on a regular basis. For example, rank selector 305 may be operable to select the rank frequently, such as once for each transmission time interval (TTI) or once for each resource block (i.e., the CQI feedback rate). Alternatively, rank selector 305 may be operable to select the rank infrequently, such as once for each of a larger specified number of TTIs or once for each of a larger specified number of resource blocks. For example, for a particular embodiment, rank selector 305 may be operable to select the rank once for each 100 TTIs.

For the embodiment in which rank selector 305 is operable to select between a low rank and a high rank, rank selector 305 may be operable to select the rank based on a capacity maximizing formula. For example, for a particular embodiment, the capacity maximizing formula may comprise the following inequality:

$$\log_2(1+SINR\_MRC) < \Sigma_i \log_2(1+SINR\_MMSE_i),$$

where SINR_MRC is the SINR after maximum ratio combining, which may be calculated based on the received signal strength from each virtual antenna, and SINR_MMSE is the SINR after minimum mean squared error combining. Thus, SINR_MRC denotes the MRC combined received signals from the strongest virtual antenna, and SINR_MMSE$_i$ denotes the MMSE combined received signals from the i$^{th}$ virtual antenna (and any other processing, such as SIC, that the subscriber station 111 is capable of performing). For this embodiment, rank selector 305 is operable to select a high rank when the inequality is satisfied and to select a low rank when the inequality is not satisfied. This method does not preclude the optimal search for the rank that would maximize the capacity over all possible ranks.

Therefore, a measurement based on a single data stream without interference (SINR_MRC) is compared to a summation of measurements for multiple data streams interfering with each other (SINR_MMSE). Using this inequality, rank selector 305 may determine which rank would maximize the capacity of subscriber station 111 and select that rank. Selecting a low rank would correspond to a request for base station 102 to transmit to subscriber station ill on a single antenna, while selecting a high rank would correspond to a request for base station 102 to transmit to subscriber station 111 on all antennas. It will be understood that for other embodiments in which rank selector 305 is operable to select from three or more ranks that the selected ranks may correspond to requests for different numbers of antennas to transmit to subscriber station 111.

Using the inequality defined above, the rank selected will depend strongly on geometry, such that weak users will be more likely to select a low rank and strong users will be more likely to select a high rank. If a subscriber station 111 has the ability to do SIC or other similar processing, then this will also be inherently included in the measurements taken into account for the rank selection, further increasing the possibility of selecting a high rank. For some embodiments, if rank selector 305 selects a low rank, the subscriber station 111 may be served by a non-spatial multiplexing scheme.

For some embodiments, scheduling data reporter 320 may be operable to report the rank selected by rank selector 305 either explicitly or implicitly. For explicit rank selection reporting, scheduling data reporter 320 explicitly provides a selected rank to base station 102. This is generally an efficient way to report rank selection. For example, if the rank is either low or high, a single bit is sufficient for scheduling data reporter 320 to provide the rank explicitly to base station 102. In addition, for a low rank, scheduling data reporter 320 may provide only a single CQI to base station 102.

For implicit rank selection reporting, scheduling data reporter 320 may indicate that a specified beam is to be switched off by base station 102 by providing a CQI value of zero for that beam. This is a simple way to report rank selection and requires no additional signaling. However, using this scheme, a CQI value has to be provided for each beam.

Figure 4:
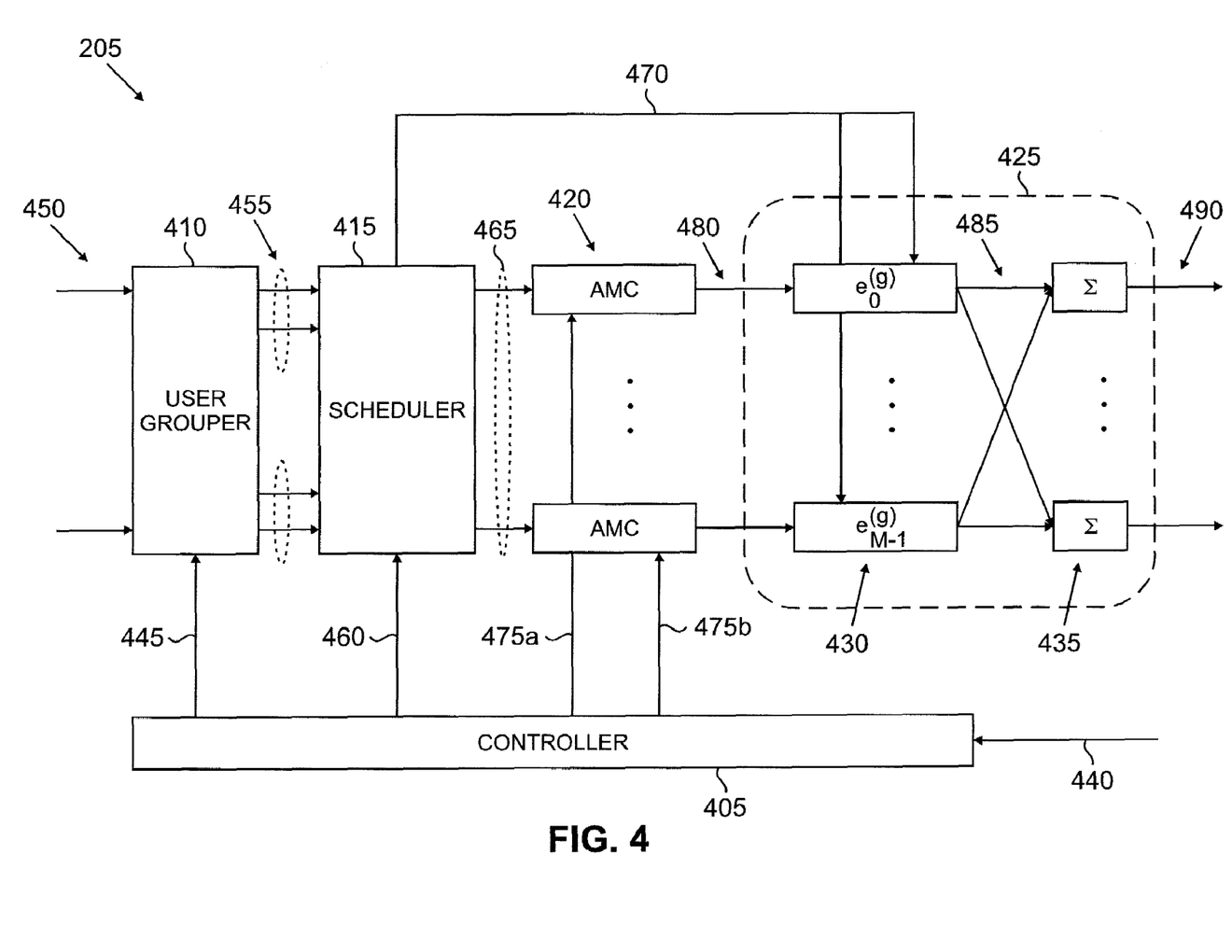
FIG. 4 illustrates details of the modulator of FIG. 2A in one of the base stations of FIG. 1 according to one embodiment of the disclosure.

FIG. 4 illustrates details of the modulator 205 in one of the base stations, such as base station 102, according to one embodiment of the disclosure. Modulator 205 comprises a controller 405, a user grouper 410, a scheduler 415, a plurality of adaptive modulation and coding (AMC) blocks 420, and a pre-coder 425 that comprises a plurality of pre-coding vector blocks 430 and a plurality of summers 435. As described below, the pre-coding vector blocks 430 are each operable to apply a pre-coding vector to an incoming signal and the pre-coding vectors together comprise a particular pre-coding matrix from a set of pre-coding matrices.

Controller 405 is operable to receive scheduling data 440 from each of a plurality of subscriber stations 111-116, or users, in base station's 102 coverage area. Controller 405 is also operable to generate a group control signal 445 for user grouper 410 based on the scheduling data 440. The group control signal 445 is operable to indicate which users have selected the same preferred pre-coding matrix.

User grouper 410 is operable to receive a stream 450 from each user and the group control signal 445 from controller 405. User grouper 410 is then operable to group the streams 450 into user groups 455 based on which users prefer the same pre-coding matrix as indicated by the group control signal 445.

Controller 405 is also operable to generate a priority control signal 460 that may be used to identify which user group 455 has the highest priority of the user groups 455 and which users have the highest priority within a user group 455. Scheduler 415 is operable to receive the user groups 455 and the priority control signal 460 and to select the highest priority streams 465 for scheduling based on the priority control signal 460. The highest priority streams correspond to the highest priority users within the highest priority user group 455, up to a maximum number, M, that corresponds to the maximum number of antennas. Scheduler 415 is also operable to generate a pre-coding matrix signal 470 that is operable to provide or identify the preferred pre-coding matrix for the user group 455 comprising the highest priority streams 465.

Controller 405 is also operable to generate a plurality of modulation and coding (MC) control signals 475 that are each operable to identify a modulation and coding scheme for a corresponding highest priority stream 465. Each AMC block 420 is operable to receive an MC control signal 475 and the corresponding highest priority stream 465 and to apply the modulation and coding scheme identified by the MC control signal 475 to the highest priority stream 465 to generate a coded stream 480.

Each of the pre-coding vector blocks 430 of pre-coder 425 is operable to receive the pre-coding matrix signal 470 and one of the coded streams 480. Each pre-coding vector block 430 is also operable to apply a pre-coding vector from the pre-coding matrix signal that was provided or identified by the pre-coding matrix signal 470 to the coded stream 480 to generate a plurality of pre-coded vector signals 485. Each summer 435 is operable to receive a pre-coded vector signal 485 from each pre-coding vector block 430 and to generate a pre-coder output signal 490 by summing the pre-coded vector signals 485.

Pre-coder 425 comprises a unitary pre-coder. For example, for one embodiment, the pre-coding vector blocks 430 may be operable to apply pre-coding vectors determined based on the following formula.

$$e_m^{(g)} = \frac{1}{\sqrt{M}} \left[ w_{0m}^{(g)} \ldots w_{(M-1)m}^{(g)} \right]^T,$$

$$w_{nm}^{(g)} = \exp\left\{ j \frac{2\pi n}{M} \left( m + \frac{g}{G} \right) \right\}.$$

For a particular example or a particular embodiment, two transmit antennas (M=2) and two possible user groups 455 (G=2) may be provided. For this example, the pre-coder set of matrices may be defined as follows:

$$\left\{ E_0 = \frac{1}{\sqrt{2}} \begin{bmatrix} 1 & 1 \\ 1 & -1 \end{bmatrix}, \; E_1 = \frac{1}{\sqrt{2}} \begin{bmatrix} 1 & 1 \\ j & -j \end{bmatrix} \right\}.$$

For another particular example, four transmit antennas (M=4) and two possible user groups 455 (G=2) may be provided. For this example, the pre-coder set of matrices may be defined as follows:

$$E_0 = \frac{1}{\sqrt{4}} \begin{bmatrix} 1 & 1 & 1 & 1 \\ 1 & e^{j\pi/2} & e^{j\pi} & e^{j3\pi/2} \\ 1 & e^{j\pi} & e^{j2\pi} & e^{j3\pi} \\ 1 & e^{j3\pi/2} & e^{j3\pi} & e^{j9\pi/2} \end{bmatrix}$$

$$= \frac{1}{\sqrt{4}} \begin{bmatrix} 1 & 1 & 1 & 1 \\ 1 & j & -1 & -j \\ 1 & -1 & 1 & -1 \\ 1 & -j & -1 & j \end{bmatrix}$$

$$E_1 = \frac{1}{\sqrt{4}} \begin{bmatrix} 1 & 1 & 1 & 1 \\ e^{j\pi/4} & e^{j3\pi/4} & e^{j5\pi/4} & e^{j7\pi/4} \\ e^{j\pi/2} & e^{j3\pi/2} & e^{j5\pi/4} & e^{j7\pi/2} \\ e^{j3\pi/4} & e^{j9\pi/4} & e^{j15\pi/4} & e^{j21\pi/4} \end{bmatrix}$$

$$= \frac{1}{\sqrt{4}} \begin{bmatrix} 1 & 1 & 1 & 1 \\ \frac{1}{\sqrt{2}}(1+j) & \frac{1}{\sqrt{2}}(-1+j) & \frac{1}{\sqrt{2}}(-1-j) & \frac{1}{\sqrt{2}}(1-j) \\ j & -j & j & -j \\ \frac{1}{\sqrt{2}}(-1+j) & \frac{1}{\sqrt{2}}(1+j) & \frac{1}{\sqrt{2}}(1-j) & \frac{1}{\sqrt{2}}(-1-j) \end{bmatrix}.$$

For the more general embodiment illustrated in FIG. 4, the set of pre-coder matrices is defined as follows:

$$E = \{E^{(0)} \ldots E^{(G-1)}\},$$

where $E^{(g)} = \left[ e_0^{(g)} \ldots e_{M-1}^{(g)} \right]$ is the $g^{th}$ pre-coding matrix and $e_m^{(g)}$ is the mth pre-coding vector in the set. For this embodiment, the CQI calculator 310 of each subscriber station 111 is operable to calculate a CQI value for each vector in each matrix in the set E. By choosing an appropriate value of G and deciding the amount of information that will be included in the scheduling data reported by each scheduling data reporter 320, the amount of feedback overhead may be traded off with the scheduling flexibility at the base station 102.

For example, for the most flexibility, the scheduling data may comprise each CQI value for each matrix in the set E, resulting in a total of GM CQI values for each subscriber station 111-116. For the lowest overhead, the scheduling data may comprise only the best CQI value and the corresponding vector identifier, which would use $\log_2(GM)$ bits per subscriber station 111-116 in addition to the actual CQI value. This embodiment would support the restricted SDMA only case, since each user is scheduled on one specific beam. This also supports the transmit beam-forming only case when a user is scheduled on the time-frequency unit. For a mix of SDM and SDMA, the scheduling data may comprise the M CQI values corresponding to the preferred pre-coding matrix selected by pre-coding matrix selector 315. It will be understood that the scheduling data may comprise any other suitable data based on the desired set-up of the overall system.

Figure 5:
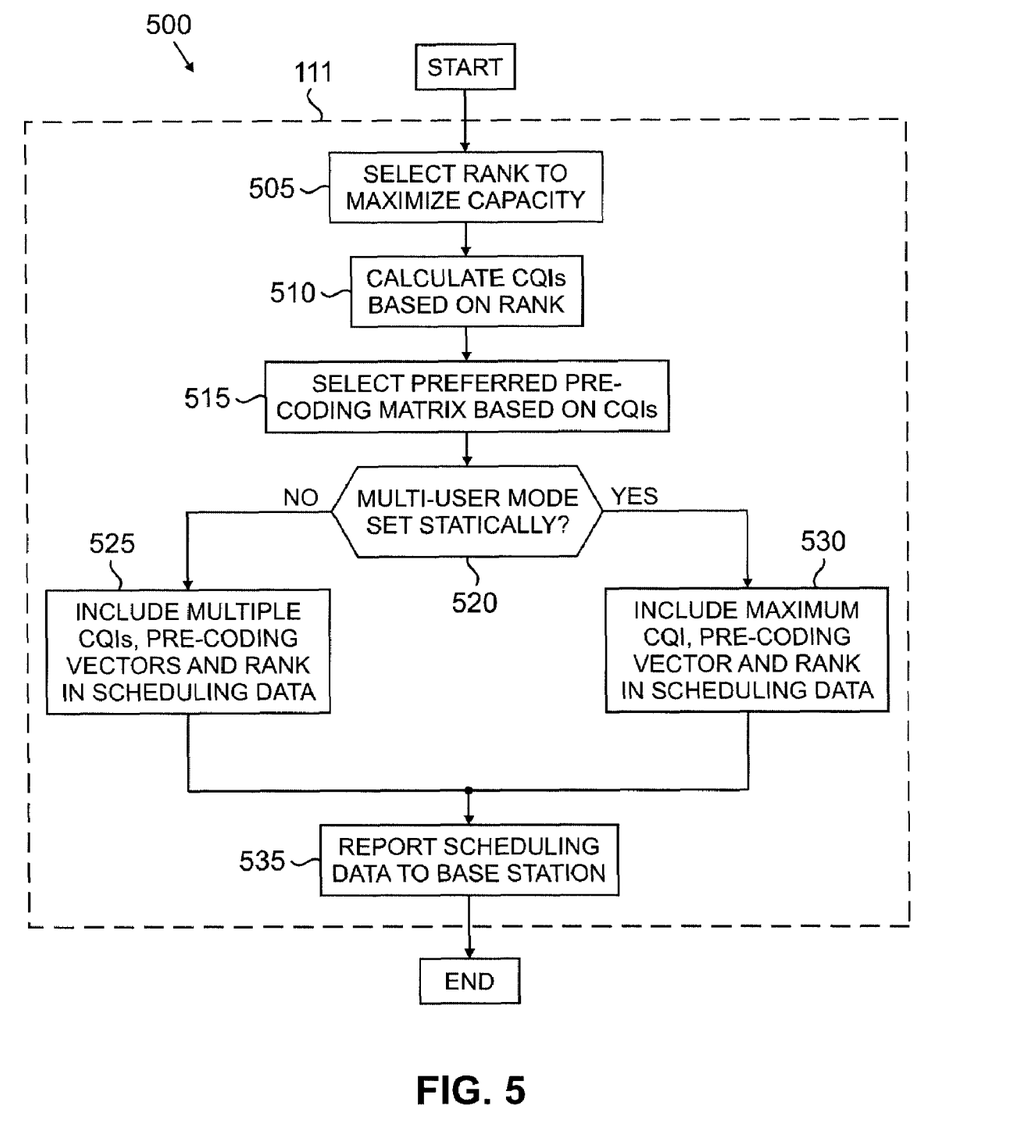
FIG. 5 is a flow diagram illustrating a method for generating scheduling data in the subscriber station of FIG. 3 according to one embodiment of the disclosure.

FIG. 5 is a flow diagram illustrating a method 500 for generating scheduling data in subscriber station 111 according to one embodiment of the disclosure. Initially, rank selector 305 selects a rank to maximize the capacity of subscriber station 111 (process step 505). CQI calculator 310 then calculates a CQI for each virtual antenna based on the selected rank (process step 510). Pre-coding matrix selector 315 then selects a preferred pre-coding matrix based on the calculated CQIs (process step 515).

If multi-user mode is not set statically (process step 520), multiple CQIs, their corresponding pre-coding vector identifiers, and the selected rank are included in the scheduling data (process step 525). However, if multi-user mode is set statically (process step 520), a maximum CQI, its corresponding pre-coding vector identifier, and the selected rank are included in the scheduling data (process step 530). Scheduling data reporter 320 then reports the scheduling data to the base station 102 providing service to subscriber station 111 (process step 535).

In this way, subscriber station 111 may request that base station 102 transmit on a particular number of antennas to maximize capacity for the subscriber station 111. For example, subscriber station 111 may report a rank of low to request transmission from a single antenna, which maximizes power, or may report a rank of high to request transmission from multiple or all antennas, which increases data rate.

Thus, for this embodiment, the subscriber station 111 reports the best CQI, as well as the pre-coder virtual antenna identifier of the codeword that is to be decoded first, i.e., the codeword that cannot benefit from SIC when MU-mode is in effect. In MU-mode, this is the only codeword that could be scheduled to this subscriber station 111. In SU-mode, the subscriber station 111 reports the M CQI values, one for each of the M codewords.

In another implementation, the subscriber station 111 only has to report a single CQI, where all M codewords will use the same link adaptation and the codewords are interleaved across the antennas such that all codewords can achieve the average capacity. These codewords may all be independently CRC-coded and can all benefit from nonlinear SIC processing.

Figure 6:
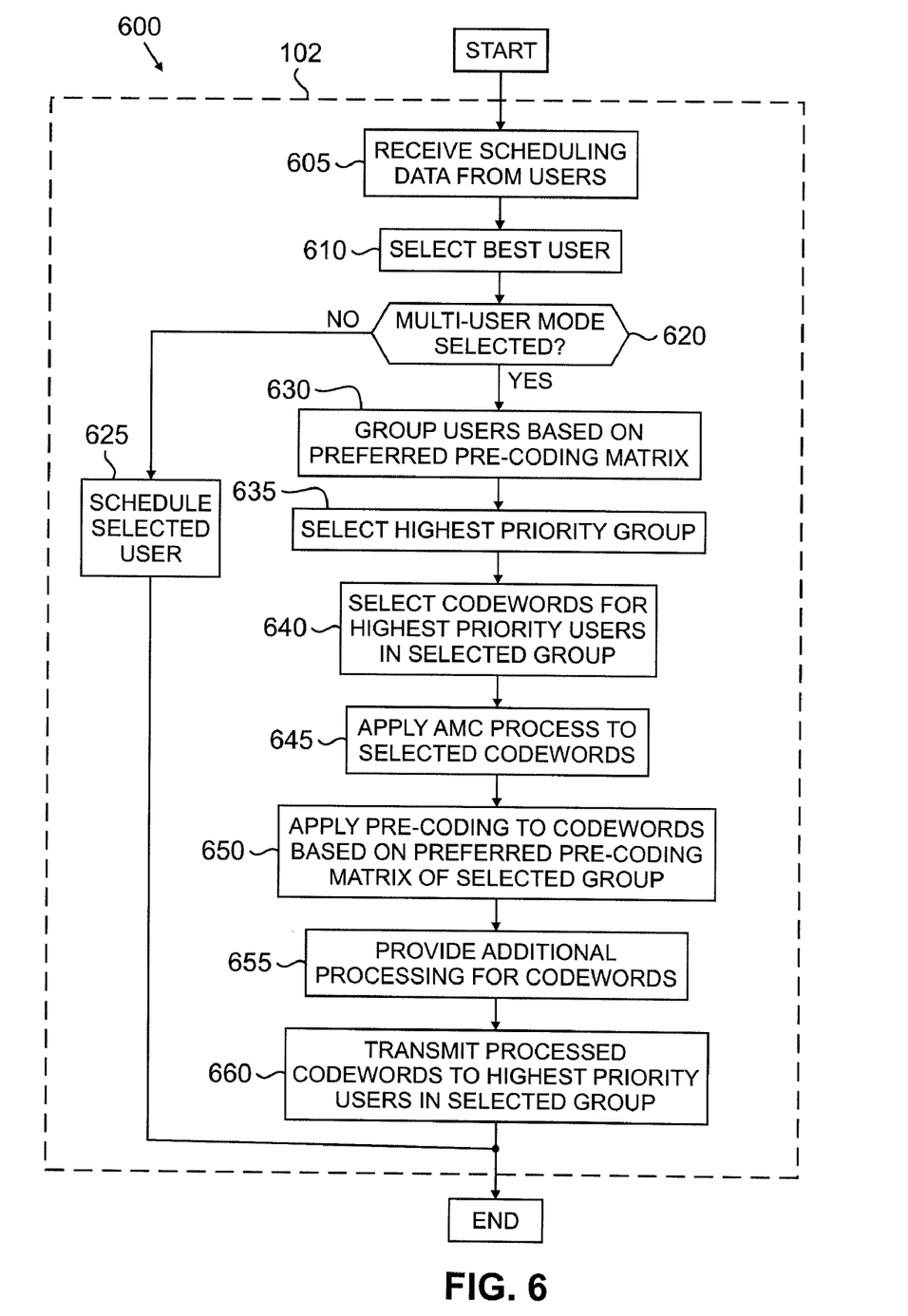
FIG. 6 is a flow diagram illustrating a method for scheduling subscriber stations based on rank using the modulator of FIG. 4 according to one embodiment of the disclosure.

FIG. 6 is a flow diagram illustrating a method 600 for scheduling subscriber stations 111-116 based on rank in a base station 102 comprising the modulator 205 illustrated in FIG. 4 according to one embodiment of the disclosure. Initially, controller 405 receives scheduling data 440 from a plurality of subscriber stations 111-116, or users (process step 605). Base station 102 selects the best user based on the proportional fair criteria or other suitable selection algorithm (process step 610). If the selected user is a low-rank user, then no further processing is required and the method comes to an end. However, if the selected user is a high-rank user, the method continues.

If base station 102 has selected a single-user (SU) mode instead of a multi-user (MU) mode (process step 620), base station 102 schedules the selected user (process step 625). For one embodiment, base station 102 may select SU-mode or MU-mode based on whether an increase in peak data rate is desired or an increase in total data rate is desired. For a particular embodiment, base station 102 may make this determination based on the number of active buffers and/or based on CQIs reported by users.

If base station 102 has selected an MU-mode instead of an SU-mode (process step 620), user grouper 410 groups the user streams 450 into user groups 455 based on the preferred pre-coding matrices of the users as identified in the scheduling data 440 (process step 630). Scheduler 415 then selects the highest priority group (process step 635) and the highest priority streams 465, or codewords, for the highest priority users in the highest priority group (process step 640). For a particular embodiment, scheduler 415 may select for the next available codeword the user that reported the highest priority for that codeword. Any subsequent user would then have to report on a complimenting pre-coding index (to the codewords that have been scheduled previously) to be considered for scheduling. Depending on the design of scheduler 415, base station 102 may schedule up to M codewords of independent data to different users or to the same user.

Each AMC block 420 applies modulation and coding to the selected codewords 465 to generate coded streams 480 (process step 645). Pre-coder 425 applies pre-coding to the coded streams 480 based on the preferred pre-coding matrix of the highest priority user group (process step 650). Additional processing may then be provided for the codewords, as described above in connection with FIG. 2A (process step 655). Base station 102 then transmits the processed codewords to the highest priority users, or subscriber stations 111-116, in the selected group (process step 660).

In this way, base station 102 schedules the users in such a manner as to maximize system capacity (a fairness-constrained greedy method). Scheduler 415 knows that with many full buffers MU-mode will maximize system capacity and that with few users SU-mode will maximize system capacity.

In addition, features of this implementation of wireless network 100 include multiple sets of unitary pre-coding that are pre-determined and multi-user diversity gain provided in the space domain by the degree of freedom in the unitary pre-coding selection. Also, with partial feedback, a user is able to report a preferred unitary pre-coding (i.e., preferred pre-coding matrix). With full feedback, a user is able to report all the CQIs corresponding to all the unitary pre-coding. To support closed-loop beamforming, the user may report the preferred beam in the preferred unitary pre-coding (i.e., preferred pre-coding vector as well as preferred pre-coding matrix).

Furthermore, using the spatial channel information fed back from the users, base station 102 may select a relevant unitary pre-coding. Since multiple users may be scheduled even in the same time-frequency resource and since the users are assigned different beams, this approach realizes SDMA. Since a single user's multiple codewords may be scheduled in the same time-frequency resource, this approach also realizes SDM. When a single user's single codeword is transmitted in a single beam, this approach also performs closed-loop beamforming.

Figure 7:
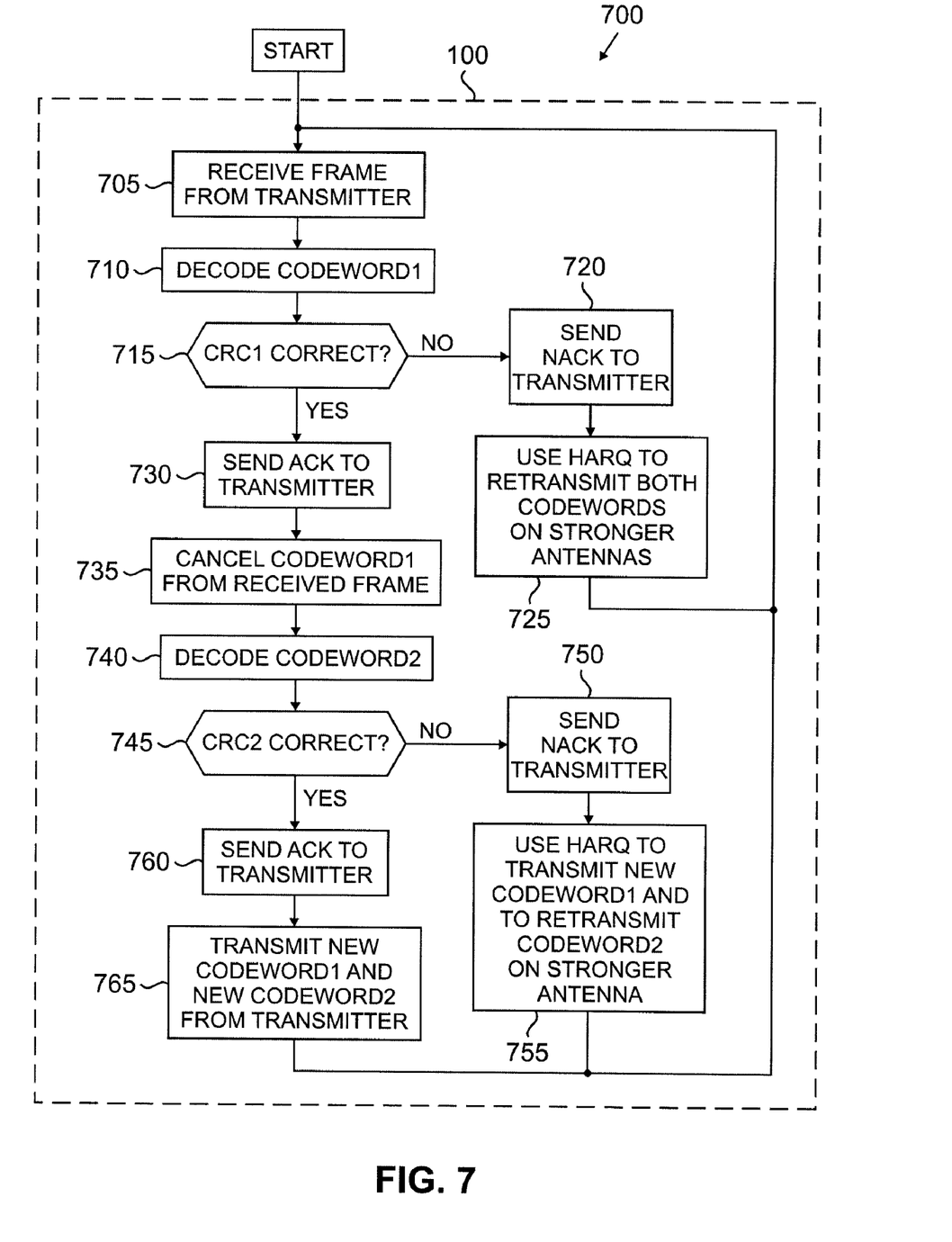
FIG. 7 is a flow diagram illustrating a method for communicating data from the transmitter of FIG. 2A to the receiver of FIG. 2B according to one embodiment of the disclosure.

FIG. 7 is a flow diagram illustrating a method 700 for communicating data from a transmitter 200, such as base station 102, to a receiver 250, such as subscriber station 111, according to one embodiment of the disclosure. Initially, receiver 250 receives a frame from transmitter 200 (process step 705). For this particular example, the frame comprises two codewords: codeword1 and codeword2. However, it will be understood that the frame may comprise any suitable number of codewords without departing from the scope of the present disclosure. In addition, each codeword in this embodiment has its own HARQ channel.

Receiver 250 decodes codeword1, which corresponds to the strongest codeword in the frame (process step 710). Receiver 250 then attempts to verify the accuracy of the decoded codeword1 by checking the CRC for codeword1 (process step 715). If CRC1 is incorrect (process step 715), receiver 250 sends a negative acknowledgement (NACK) message to transmitter 200 for both codewords (process step 720). This is because, as codeword1 was not decoded successfully, receiver 250 assumes codeword2, which is weaker than codeword1, will not be successfully decoded either. Transmitter 200, upon receiving the NACK messages, uses HARQ messaging to retransmit both codewords, codeword1 and codeword2, from transmitter 200 to receiver 250 using a stronger antenna for each (process step 725).

Once codeword1 is verified by a successful CRC check (process step 715), receiver 250 sends an acknowledgement (ACK) message to transmitter 200 for codeword1 (process step 730). Receiver 250 then cancels the reconstructed codeword1 signal from the received frame (process step 735).

Receiver 250 next decodes codeword2 (process step 740). Receiver 250 then attempts to verify the accuracy of the decoded codeword2 by checking the CRC for codeword2 (process step 745). If CRC2 is incorrect (process step 745), receiver 250 sends a NACK message to transmitter 200 for codeword2 (process step 750). Transmitter 200, upon receiving the NACK message, uses HARQ messaging to transmit a new codeword1 (since the old codeword1 was already successfully decoded) and to retransmit codeword2 on a stronger antenna (process step 755).

Once codeword2 is verified by a successful CRC check (process step 745), receiver 250 sends an ACK message to transmitter 200 for codeword2 (process step 760). Transmitter 200, upon receiving the ACK message, transmits two new codewords from transmitter 200 to receiver 250 (process step 765).

In this way, HARQ messaging may be used together with a MIMO system in order to increase throughput. Using HARQ messaging allows the codewords to be transmitted at the lowest possible power for increased efficiency. In addition, when the first codeword is successfully decoded and the second codeword is not, transmitter 200 need not retransmit the first codeword with the second codeword. Because a new codeword is transmitted with the retransmitted second codeword, resources are not wasted on duplicate transmissions.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. In a wireless network comprising a plurality of subscriber stations and a base station capable of providing service to the subscriber stations, a subscriber station comprising:
   a rank selector operable to select a rank for the subscriber station, the rank operable to identify a number of antennas for transmitting data streams from the base station to the subscriber station;
   a scheduling data reporter operable to report scheduling data to the base station, the scheduling data comprising the rank;
   a channel quality indicator (CQI) calculator operable to calculate a CQI for each of a plurality of codewords received from each antenna of the base station based on the rank; and
   a pre-coding matrix selector operable to select a preferred pre-coding matrix from a set of pre-coding matrices for the subscriber station based on at least one of the CQIs;
   wherein the scheduling data further comprises a maximum CQI when a multi-user mode is set statically and multiple CQIs when the multi-user mode is not set statically.

2. The subscriber station as set forth in claim 1, the rank selector operable to select as a rank for the subscriber station one of low and high.

3. The subscriber station as set forth in claim 2,
   the number of antennas for transmitting data streams from the base station to the subscriber station identified by the rank of low comprising one; and
   the number of antennas for transmitting data streams from the base station to the subscriber station identified by the rank of high comprising M, M comprising a maximum number of antennas available for transmitting data streams from the base station.

4. The subscriber station as set forth in claim 1, the rank selector operable to select the rank once for each of a specified number of transmission time intervals (TTIs).

5. The subscriber station as set forth in claim 1, the rank selector operable to select the rank based on a capacity maximizing formula.

6. The subscriber station as set forth in claim 5, the capacity maximizing formula comprising the inequality $\log_2(1+\text{MRC}) < \Sigma_i \log_2(1+\text{MMSE}_i)$, wherein MRC is a Signal-to-Interference-plus-Noise Ratio (SINR) after maximum ratio combining and $\text{MMSE}_i$ is a SINR after minimum mean squared error combining, wherein the rank selector is operable to select a rank of high when the inequality is satisfied and to select a rank of low when the inequality is not satisfied.

7. The subscriber station as set forth in claim 1, the scheduling data further comprising the preferred pre-coding matrix.

8. The subscriber station as set forth in claim 7, wherein each matrix in the set of pre-coding matrices comprises a plurality of vectors, and wherein the CQI calculator is operable to calculate a CQI for each vector in each matrix in the set of pre-coding matrices.

9. The subscriber station as set forth in claim 1, the scheduling data reporter operable to report scheduling data comprising a first set of data when the base station is operating in a multi-user mode and to report scheduling data comprising a second set of data when the base station is operating in a single-user mode.

10. The subscriber station as set forth in claim 1, the scheduling data reporter operable to report scheduling data using one of explicit rank selection reporting and implicit rank selection reporting.

11. The subscriber station as set forth in claim 1, the subscriber station operable to decode frames received from the base station using hybrid automatic repeat request (HARQ) messaging.

12. A method for scheduling users in a base station based on user-determined ranks in a MIMO system, comprising:
   receiving scheduling data from each of a plurality of users, the scheduling data for each user comprising at least one CQI, a rank and a preferred pre-coding matrix, the preferred pre-coding matrix selected based on the at least one CQI, the at least one CQI comprising a maximum CQI when a multi-user mode is set staticall and multiple CQIs when the multi-user mode is not set statically; and
   scheduling the users based on the scheduling data by grouping the users into user groups, each user group comprising a same preferred pre-coding matrix.

13. The method as set forth in claim 12, scheduling the users based on the scheduling data further comprising:
   selecting a highest priority user group;
   selecting a specified number of highest priority users in the highest priority user group; and
   scheduling the specified number of highest priority users in the highest priority user group.

14. The method as set forth in claim 13, scheduling the users based on the scheduling data further comprising applying modulation and coding to a codeword for each of the highest priority users.

15. The method as set forth in claim 14, scheduling the users based on the scheduling data further comprising applying pre-coding to the modulated and coded codewords based on the preferred pre-coding matrix for the highest priority user group.

16. The method as set forth in claim 15, scheduling the users based on the scheduling data further comprising transmitting the coded codewords to the highest priority users in the highest priority user group.

17. The method as set forth in claim 12, further comprising determining whether to operate in one of a multi-user mode and a single-user mode based on the scheduling data.

18. The method as set forth in claim 17, scheduling the users based on the scheduling data comprising scheduling a best user when operating in a single-user mode.

19. The method as set forth in claim 17, scheduling the users based on the scheduling data comprising scheduling a highest priority group of users when operating in a multi-user mode, the highest priority group of users comprising a same preferred pre-coding matrix.

20. In a wireless network comprising a plurality of subscriber stations and a base station capable of providing service to the subscriber stations, a method at a subscriber station, the method comprising:
- selecting a rank for the subscriber station, the rank operable to identify a number of antennas for transmitting data streams from the base station to the subscriber station;
- reporting scheduling data to the base station, the scheduling data comprising the rank;
- calculating a channel quality indicator (CQI) for each of a plurality of codewords received from each antenna of the base station based on the rank; and
- selecting a preferred pre-coding matrix from a set of pre-coding matrices for the subscriber station based on at least one of the CQIs;
- wherein the scheduling data further comprises a maximum CQI when a multi-user mode is set statically and multiple CQIs when the multi-user mode is not set statically.

* * * * *